(12) United States Patent
Tosaki (10) Patent No.: US 12,513,403 B2
(45) Date of Patent: Dec. 30, 2025

(54) TRACKING IMAGE CAPTURING SYSTEM AND CONTROL METHOD THEREFOR, AND STORAGE MEDIUM

(71) Applicant: CANON KABUSHIKI KAISHA, Tokyo (JP)

(72) Inventor: Takumi Tosaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 18/496,677

(22) Filed: Oct. 27, 2023

(65) Prior Publication Data

US 2024/0147075 A1 May 2, 2024

(30) Foreign Application Priority Data

Oct. 31, 2022 (JP) ................. 2022-175025

(51) Int. Cl.
*H04N 23/695* (2023.01)
*G06V 10/22* (2022.01)
*G06V 20/40* (2022.01)
*H04N 23/60* (2023.01)
*H04N 23/611* (2023.01)
*H04N 23/661* (2023.01)
*H04N 23/69* (2023.01)
*H04N 23/90* (2023.01)

(52) U.S. Cl.
CPC ......... *H04N 23/695* (2023.01); *G06V 10/225* (2022.01); *G06V 20/42* (2022.01); *H04N 23/611* (2023.01); *H04N 23/64* (2023.01); *H04N 23/662* (2023.01); *H04N 23/69* (2023.01); *H04N 23/90* (2023.01)

(58) Field of Classification Search
None
See application file for complete search history.

(56) References Cited

U.S. PATENT DOCUMENTS

| | | | | |
|---|---|---|---|---|
| 2008/0074835 | A1* | 3/2008 | Yu | G06F 1/1686 361/679.27 |
| 2010/0265331 | A1* | 10/2010 | Tanaka | G08B 13/19673 348/36 |
| 2020/0389573 | A1* | 12/2020 | Kobayashi | H04N 23/72 |

(Continued)

FOREIGN PATENT DOCUMENTS

| | | |
|---|---|---|
| JP | 2018198470 A | 12/2018 |
| JP | 2020074665 A | 5/2020 |

*Primary Examiner* — Edemio Navas, Jr.
(74) *Attorney, Agent, or Firm* — Canon U.S.A., Inc., IP Division (57) ABSTRACT

A tracking image capturing system includes a first acquisition unit that acquires a first bird's-eye view image, a second acquisition unit that acquires a second image corresponding to a part of the first image, a first detection unit that detects a tracking target from the first image, a first determination unit that determines an angle of view of the second acquisition unit so that an image includes the tracking target, a second detection unit that detects the tracking target from the second image, a second determination unit that determines an angle of view of the second acquisition unit so that an image includes the tracking target, and a control unit that controls an angle of view of the second acquisition unit based on either the angle of view determined by the first determination unit or by the second determination unit.

13 Claims, 12 Drawing Sheets

(56) References Cited

U.S. PATENT DOCUMENTS

| | | | |
|---|---|---|---|
| 2020/0401031 A1* | 12/2020 | Ikeda | H04N 21/4122 |
| 2021/0248778 A1* | 8/2021 | Fujiwaka | G06T 7/75 |
| 2023/0140505 A1* | 5/2023 | Amato | G06F 18/21 382/103 |
| 2024/0015398 A1* | 1/2024 | Sugimoto | H04N 23/69 |

* cited by examiner

| FRAME NUMBER | CLASS | IMAGE COORDINATES |
|---|---|---|
| t1 | Player1 | Xl1a, Yl1a, Xr1a, Yr1a |
| t1 | Player2 | Xl1b, Yl1b, Xr1b, Yr1b |
| t1 | Player3 | Xl1c, Yl1c, Xr1c, Yr1c |
| t1 | Player4 | Xl1d, Yl1d, Xr1d, Yr1d |
| t1 | Ball | Xl1e, Yl1e, Xr1e, Yr1e |
| t2 | Player1 | Xl2a, Yl2a, Xr2a, Yr2a |
| t2 | Player2 | Xl2b, Yl2b, Xr2b, Yr2b |
| ⋮ | ⋮ | ⋮ |

TRACKING IMAGE CAPTURING SYSTEM AND CONTROL METHOD THEREFOR, AND STORAGE MEDIUM

BACKGROUND

Field

The present disclosure relates to a tracking image capturing system that tracks and captures an image of a subject.

Description of the Related Art

Automatic shooting of sports has attracted attention in recent years from the viewpoint of labor saving and the like. Automatic shooting is a technique of automatically tracking and capturing a player using a camera (hereinafter, referred to as "PTZ camera") that overlooks an entire sports scene which shoots details of play by performing a panning operation, a tilting operation, and a zooming operation. There are various ways of determining the angle of view of the PTZ camera depending on a target sport, but in ball games such as basketball and soccer, the angle of view is often determined based on the ball position.

In order to cause the PTZ camera to automatically track a tracking target, it is a common practice to determine the tracking target from a bird's-eye view image using a recognition technique and to control the angle of view of the PTZ camera by communication such as IP or RS-422. However, in such a system, since a certain amount of time is required for calculation and communication of subject recognition, control of the PTZ camera is delayed with respect to timing at which the bird's-eye view image is captured. Therefore, a case of failing to capture the tracking target in the angle of view of the PTZ camera occurs.

Japanese Patent Laid-Open No. 2018-198470 discloses a technique of performing tracking control on a tracking target selected by a user by predicting a position of the tracking target after a control delay time. Japanese Patent Laid-Open No. 2020-74665 discloses a technique of shortening calculation time by switching to a recognition model with fewer recognition targets in a case where the ratio of recognition targets recognized as a specific action is equal to or greater than a threshold.

However, in a case where the above-described known technique is used in a system for automatic shooting of sports, there are the following problems.

In the technique described in Japanese Patent Laid-Open No. 2018-198470, since motion of a player is complicated in a sports scene, it is difficult to perform tracking with high accuracy in position prediction by interpolation. Since delay due to communication is not uniform, it is not possible to cope with an irregular delay.

In the technique described in Japanese Patent Laid-Open No. 2020-74665, a delay due to calculation is reduced by switching to a low level model where a recognition target is abstracted based on statistics. However, in a recognition technique in automatic shooting of a sport image, switching to a low level model by abstraction cannot be performed.

SUMMARY OF THE INVENTION

The present disclosure has been made in view of the above-described problems, and prevents a moving subject to be tracked from going out of an angle of view when tracking and capturing the subject.

According to a first aspect of the present disclosure a tracking image capturing system is provided and includes at least one processor configured to function as a first acquisition unit that acquires a first bird's-eye view image; a second acquisition unit that acquires a second image corresponding to a part of the first image; a first detection unit that detects a tracking target from the first image; a first determination unit that determines an angle of view of an image acquired by the second acquisition unit so that an image acquired by the second acquisition unit includes the tracking target based on a result of detection by the first detection unit; a second detection unit that detects the tracking target from the second image; a second determination unit that determines an angle of view of an image acquired by the second acquisition unit so that an image acquired by the second acquisition unit includes the tracking target based on a result of detection by the second detection unit; and a control unit that controls an angle of view of an image acquired by the second acquisition unit based on either the angle of view determined by the first determination unit or the angle of view determined by the second determination unit.

According to a second aspect of the present disclosure, a method for controlling a tracking image capturing system is provided and includes a first acquisition unit that acquires a first bird's-eye view image and a second acquisition unit that acquires a second image corresponding to a part of the first image, the method comprising: performing first detection of detecting a tracking target from the first image; performing first determination of determining an angle of view of an image acquired by the second acquisition unit so that an image acquired by the second acquisition unit includes the tracking target based on a detection result in the first detection; performing second detection of detecting the tracking target from the second image; performing second determination of determining an angle of view of an image acquired by the second acquisition unit so that an image acquired by the second acquisition unit includes the tracking target based on a detection result in the second detection; and controlling an angle of view of an image acquired by the second acquisition unit based on either the angle of view determined by the first determination or the angle of view determined by the second determination.

Further features of the present disclosure will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

First Embodiment

In the first embodiment, a system will be described in which a bird's-eye view image of sports acquired by an image capturing device used as an input, a tracking target having been set is recognized from the image, and an image corresponding to a part of the bird's-eye view image including the tracking target is automatically tracked and captured by a pan/tilt image capturing device. In the present embodiment, "class" represents a ball and a player, and it is assumed that the player can allocate a class to each player.

Figure 1:
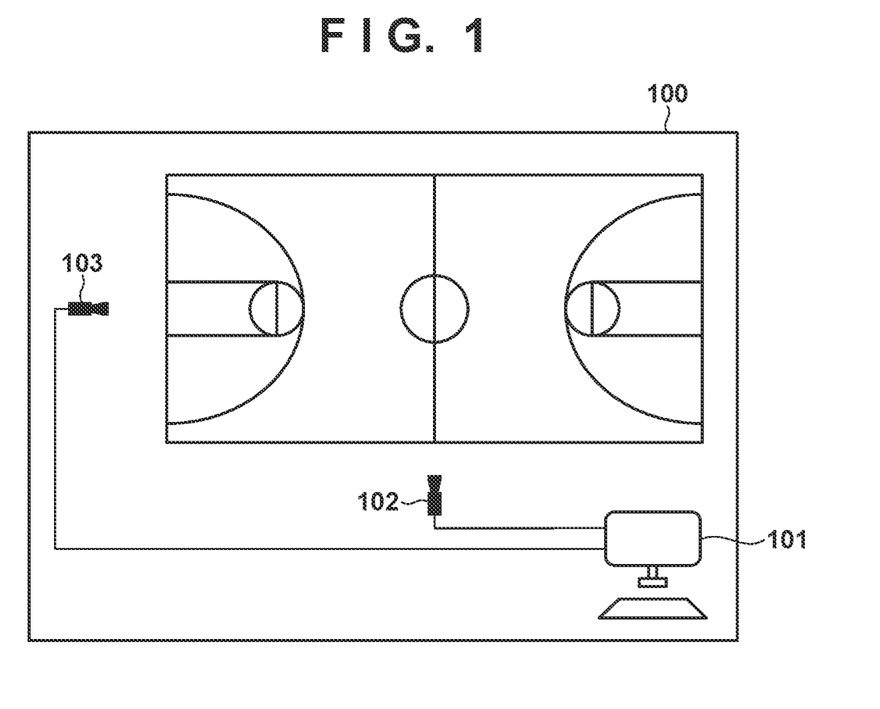
FIG. 1 is a view illustrating a configuration of a tracking image capturing system in a first embodiment.

FIG. 1 is a view illustrating the configuration of a tracking image capturing system 100 in the first embodiment.

In FIG. 1, the tracking image capturing system 100 includes a bird's-eye view image capturing device 102 that shoots a bird's-eye view image of a sports scene (FIG. 1 illustrates a basketball court), and a pan/tilt image capturing device 103 that shoots a detailed image of play of a sport. An image shot by the bird's-eye view image capturing device 102 is input to a control device 101 having an image processing function, and the control device 101 controls the pan/tilt image capturing device 103 based on the information.

More specifically, the control device 101 recognizes the position of the tracking target with the image from the bird's-eye view image capturing device 102 as an input, and transmits a pan/tilt control signal to the pan/tilt image capturing device 103. The pan/tilt image capturing device 103 may be configured to include a zoom mechanism or an electronic zoom function and to be able to perform a zooming operation. The pan/tilt image capturing device 103 may change the angle of view by changing the clipping coordinates of a moving image without including a pan/tilt mechanism.

Figure 2:
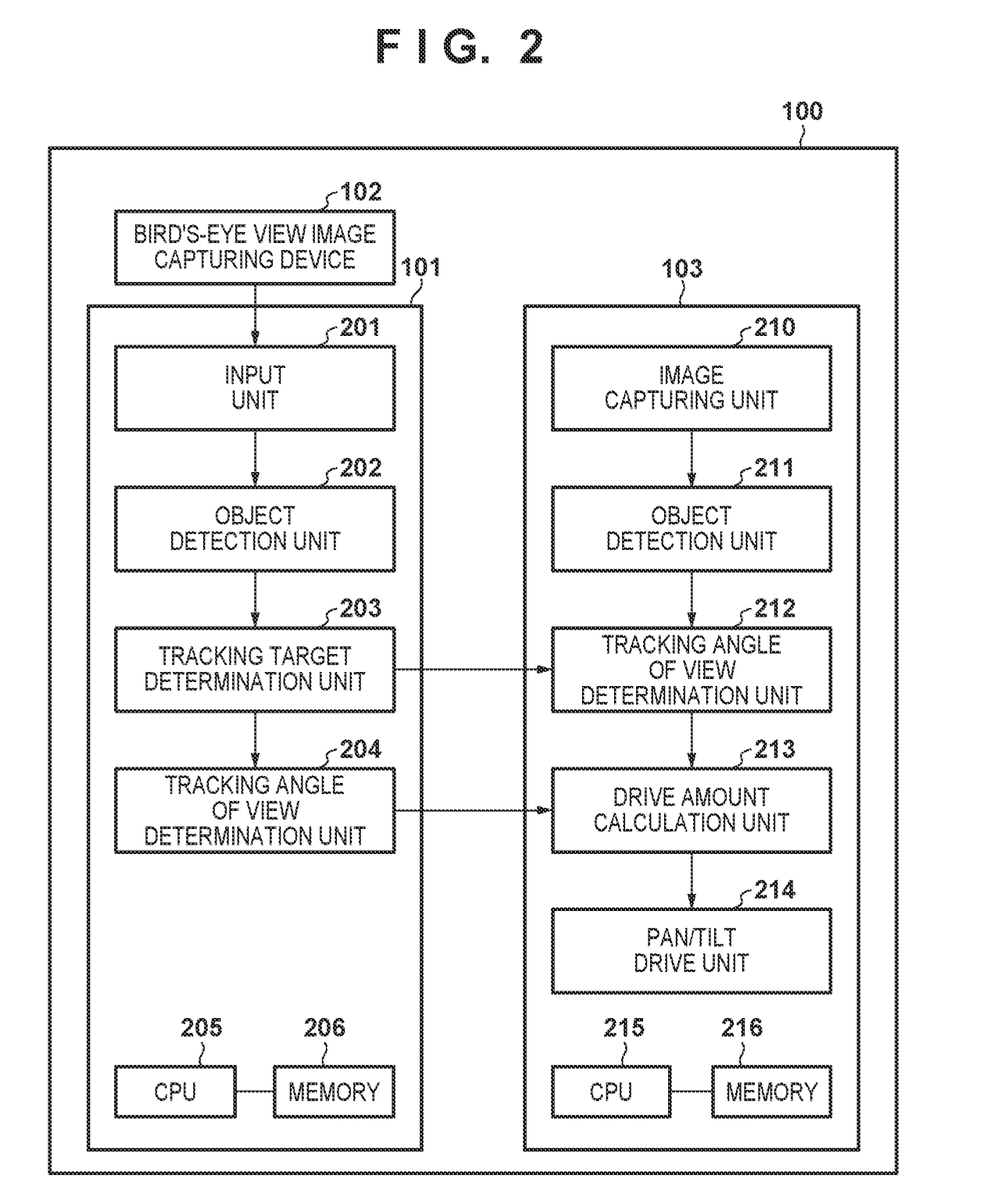
FIG. 2 is a view illustrating a block configuration of the tracking image capturing system.

FIG. 2 is a view illustrating a block configuration of the tracking image capturing system 100.

In FIG. 2, the control device 101 includes an input unit 201, an object detection unit 202, a tracking target determination unit 203, a tracking angle of view determination unit 203, a CPU 205 including a microcomputer, and a memory 206. The CPU 205 controls the entire control device 101 by executing a program stored in the memory 206. Note that the input unit 201, the object detection unit 202, the tracking target determination unit 203, and the tracking angle of view determination unit 203 may be configured by circuits that implement respective functions, or may be implemented by the CPU 205 executing a program in the memory 206.

The pan/tilt image capturing device 103 includes an image capturing unit 210, an object detection unit 211, a tracking angle of view determination unit 212, a drive amount calculation unit 213, a pan/tilt drive unit 214, a CPU 215 including a microcomputer, and a memory 216. The CPU 215 controls the entire pan/tilt image capturing device 103 by executing a program stored in the memory 216. Note that the object detection unit 211, the tracking angle of view determination unit 212, and the drive amount calculation unit 213 may be configured by circuits that implement respective functions, or may be implemented by the CPU 215 executing a program in the memory 216.

Note that the above description includes a case where the tracking image capturing system 100 is separately arranged in three housings of the control device 101, the bird's-eye view image capturing device 102, and the pan/tilt image capturing device 103. However, the present disclosure is not limited to this configuration. For example, the entirety or a part of the control device 101 and the bird's-eye view image capturing device 102 may be arranged in the same housing, or the entirety or a part of the control device 101 and the pan/tilt image capturing device 103 may be arranged in the same housing. These elements may all be arranged in the same housing. That is, each component constituting the tracking image capturing system 100 can be arranged in any combination in one or any number of housings.

In FIG. 2, the input unit 201 of the control device 101 captures, as an image signal, a moving image shot by the bird's-eye view image capturing device 102, and outputs the image signal to the object detection unit 202.

The object detection unit 202 detects which object to be present at which position in a bird's-eye view image having been input from the input unit 201. The object detection is performed by an object detection model generated from learning data in advance. In the present embodiment, a neural network, particularly a convolutional neural network is used as an object detection processing means. However, not only the convolutional neural network but also other models may be used, and not only the neural network but also other known machine learning techniques may be used. An output result of the object detection unit 202 is output to the tracking target determination unit 203.

The tracking target determination unit 203 determines a tracking target based on the detection result of the object detection unit 202, and outputs the tracking target to the tracking angle of view determination unit 204.

Based on the detection coordinates of the tracking target determined by the tracking target determination unit 203, and the tracking angle of view determination unit 204 determines and outputs, to the drive amount calculation unit 212 of the pan/tilt image capturing device 103, an angle of view to be shot by the pan/tilt image capturing device 103.

On the other hand, the image capturing unit 210 of the pan/tilt image capturing device 103 includes a lens that forms a subject image, a drive unit thereof, and an image capturing element, captures a moving image, and outputs an image signal. This image signal is input to the object detection unit 211, and, similarly to the object detection unit 202, the object detection unit 211 detects which object to be present at which position, and outputs the information to the tracking angle of view determination unit 212.

The tracking angle of view determination unit 212 determines an angle of view to be shot by the pan/tilt image capturing device 103 based on detection coordinates of an object of the same class as the tracking target determined by the tracking target determination unit 203 among the detection results of the object detection unit 211. Then, the information is output to the drive amount calculation unit 213.

The drive amount calculation unit 213 calculates and outputs, to the pan/tilt drive unit 214, a pan/tilt drive amount of the pan/tilt image capturing device 103 based on the angle of view of either the tracking angle of view determination unit 204 or the tracking angle of view determination unit 212.

The pan/tilt drive unit 214 controls the pan/tilt mechanism of the image capturing unit 210 based on the pan/tilt drive amount calculated by the drive amount calculation unit 213.

Figure 3A:
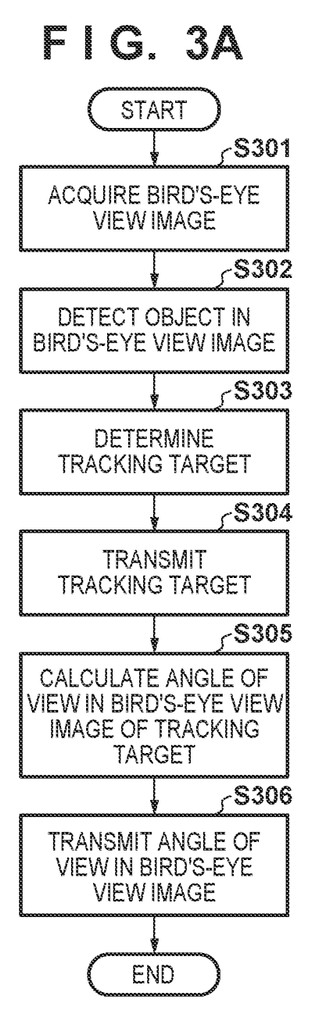
FIGS. 3A and 3B are flowcharts showing an operation of the tracking image capturing system.
Figure 3B:
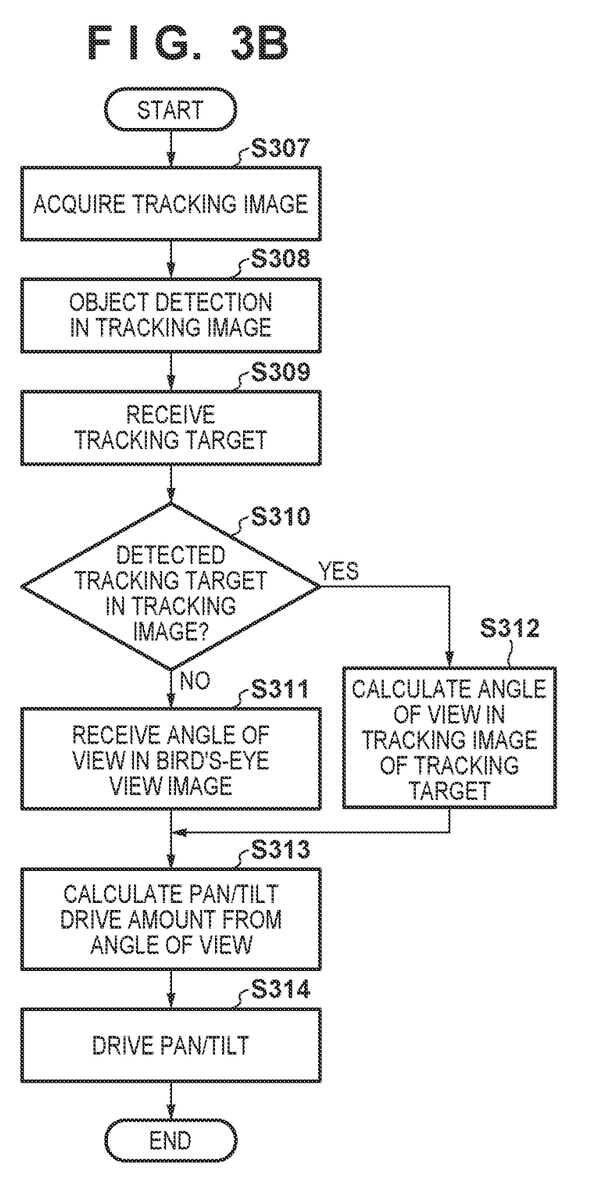

Next, the operation of the tracking image capturing system 100 configured as described above will be described with reference to the flowcharts shown in FIGS. 3A and 3B. Here, FIG. 3A is a flowchart showing the operations of the control device 101 and the bird's-eye view image capturing device 102 among operations of the tracking image capturing system 100, and FIG. 3B is a flowchart showing the operation of the pan/tilt image capturing device 103.

Figure 4:
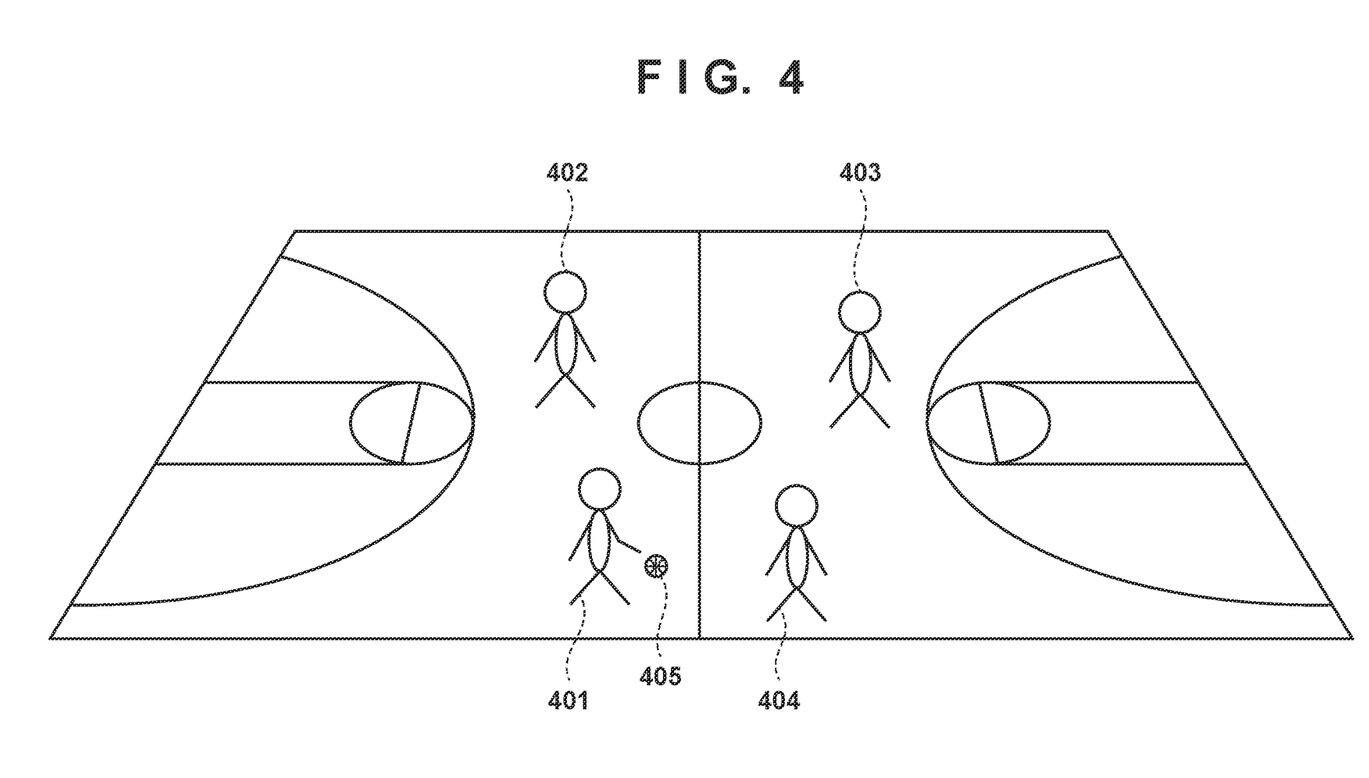
FIG. 4 is a view illustrating an example of a bird's-eye view image.

In step S301, the CPU 205 of the control device 101 acquires a bird's-eye view image from the bird's-eye view image capturing device 102 using the input unit 201. FIG. 4 illustrates an example of the bird's-eye view image. Players 401, 402, 403, and 404 and a ball 405 are captured in the image. In this scene where the player 401 holds the ball 405, the pan/tilt image capturing device 103 is required to control to capture the player 401 holding the ball 405.

In step S302, using the object detection unit 202, the CPU 205 detects an object from the image acquired in step S301. The object detection is executed by inputting the image acquired in step S301 to an object detection model.

Figure 5:
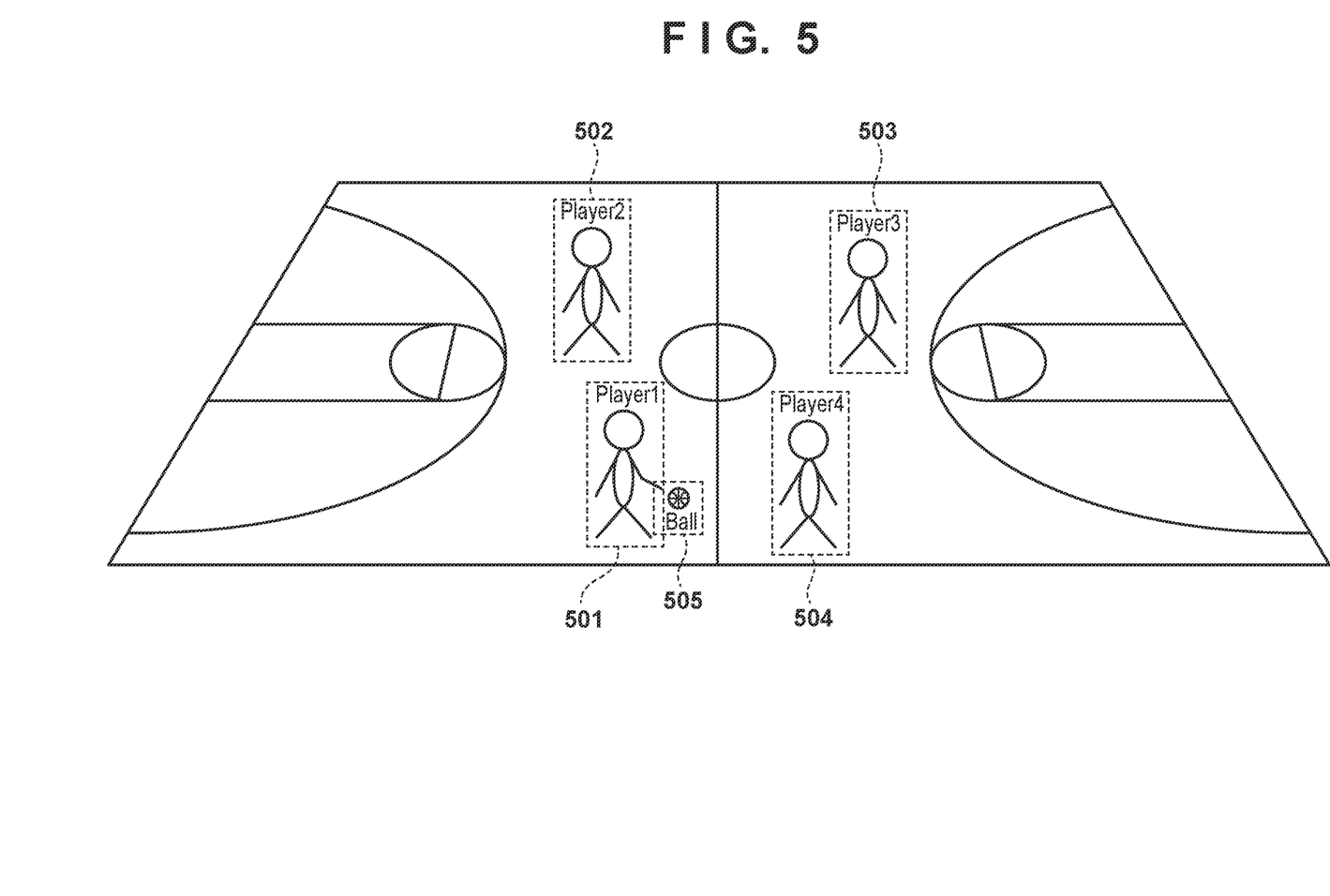
FIG. 5 is a view illustrating a result of object detection processing on a bird's-eye view image.

FIG. 5 illustrates an example of a result of performing the object detection processing on the image of FIG. 4. As the recognition result of the players 401, 402, 403, and 404, the position and the class are respectively output as indicated by detection frames 501, 502, 503, and 504, and the recognition result of the ball 405 is output as indicated by a detection frame 505.

Figure 6:
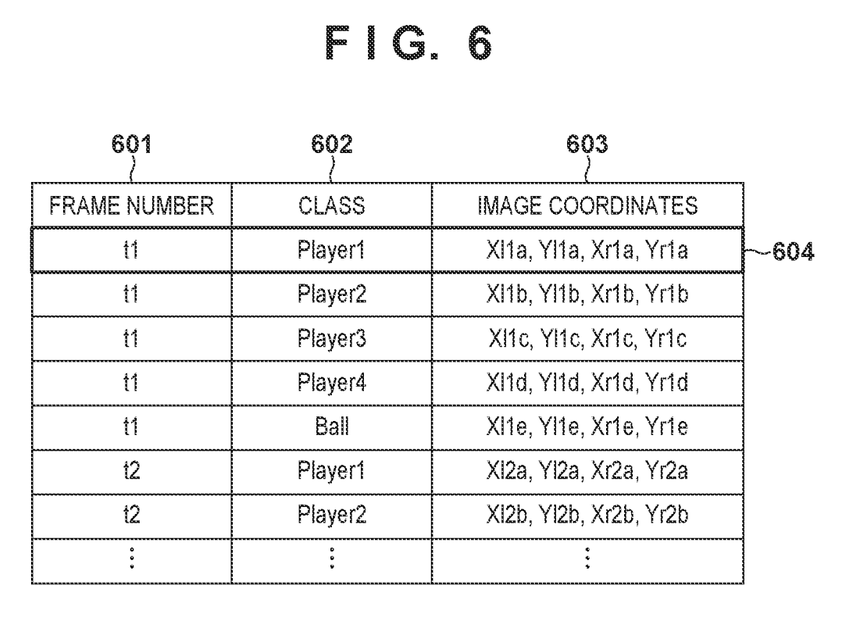
FIG. 6 is a table showing output information of object detection processing on a bird's-eye view image.

FIG. 6 illustrates an example of output information of the object detection processing. In the structure of the output information of the object detection result, a frame number 601 holds a frame number for which the object detection processing has been performed. A class 602 holds the class of a detected object. An image coordinate 603 holds image coordinates on a bird's-eye view image of the detected object. The position of the detection frame can be determined when the coordinates (Xl1a, Yl1a) of the upper left point of the frame and the coordinates (Xr1a, Yr1a) of the lower right point of the frame are known.

In step S303, using the tracking target determination unit 203, the CPU 205 determines the tracking target based on the result of the object detection processing in step S302. In the present embodiment, the player 401 holding the ball 405 is determined as the tracking target.

In step S304, the CPU 205 transmits information on the player 401 determined as the tracking target in step S303 to the pan/tilt image capturing device 103.

In step S305, the CPU 205 determines the angle of view of the pan/tilt image capturing device 103 based on an object detection result 604 of the player 401 of the tracking target determined in step S303 using the tracking angle of view determination unit 204.

In step S306, the CPU 205 transmits the angle of view determined in step S305 to the pan/tilt image capturing device 103.

Figure 7:
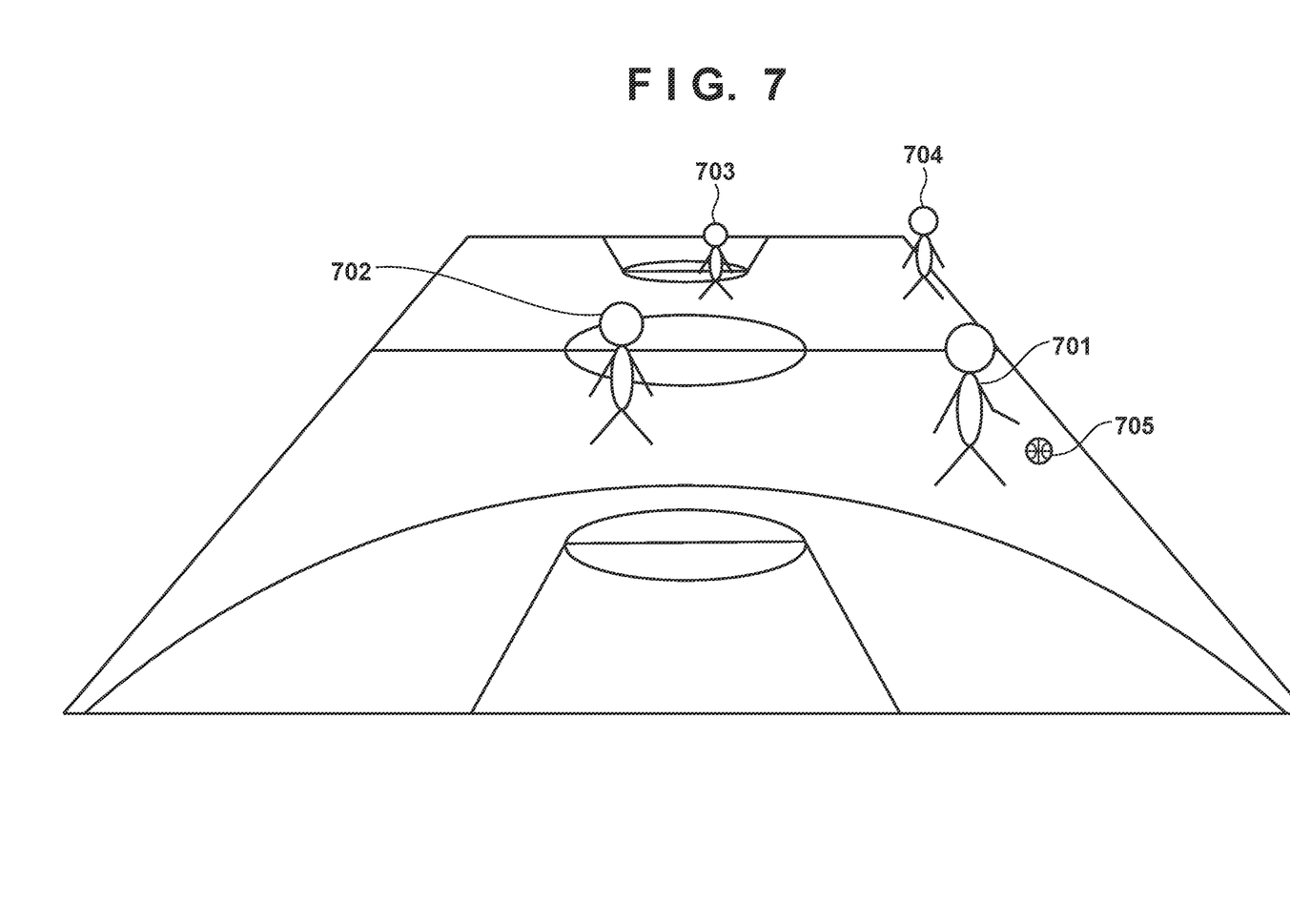
FIG. 7 is a view illustrating an example of a tracking image.

In step S307, the CPU 215 of the pan/tilt image capturing device 103 acquires the tracking image using the image capturing unit 210. FIG. 7 illustrates an example of the tracking image. Players 701, 702, 703, and 704 and a ball 705 are captured in the image.

In step S308, using the object detection unit 211, the CPU 215 detects an object from the image acquired in step S307. The object detection is executed by inputting the image acquired in step S307 to an object detection model.

Figure 8:
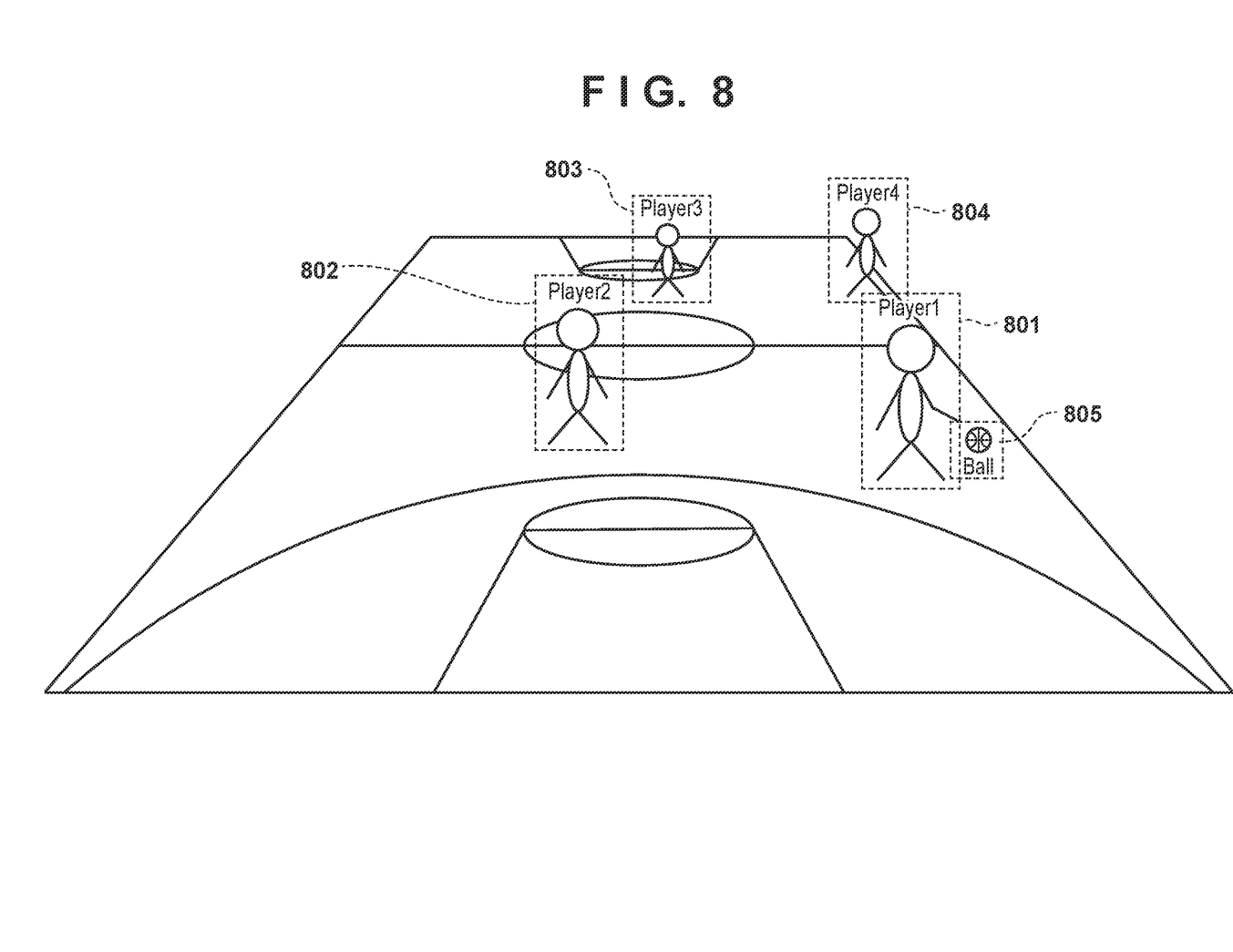
FIG. 8 is a view illustrating a result of object detection processing on a tracking image.

FIG. 8 illustrates an example of a result of performing the object detection processing on the image of FIG. 7. As the recognition result of the players 701, 702, 703, and 704, the position and the class are respectively output as indicated by detection frames 801, 802, 803, and 804, and the recognition result of the ball 705 is output as indicated by a detection frame 805.

In step S309, the CPU 215 receives the information on the tracking target transmitted from the control device 101 in step S304.

In step S310, the CPU 215 determines whether or not the class of the player 401 of the tracking target received in step S309 exists in the detection result of the object detection unit 211 in step S308. The CPU 215 proceeds with the processing to step S311 if the class of the player 401 of the tracking target does not exist, and proceeds with the processing to step S312 if the class exists. If the class does not exist, the CPU 215 may determine a tracking target based on the detection result of the object detection unit 211, and may proceed with the processing to step S312.

In step S311, the CPU 215 receives the angle of view transmitted from the control device 101 in step S306. Then, the received angle of view is determined as the angle of view of the pan/tilt image capturing device 103.

In step S312, the CPU 215 determines the angle of view of the pan/tilt image capturing device 103 using the tracking angle of view determination unit 212 based on the object detection result of the player 701 of the same class as the player 401 of the tracking target received in step S309.

In step S313, the CPU 215 calculates the pan/tilt drive amount using the drive amount calculation unit 213 based on the angle of view of the pan/tilt image capturing device 103 determined in either step S311 or step S312.

In step S314, the CPU 215 controls the pan/tilt mechanism of the image capturing unit 210 using the pan/tilt drive unit 214 based on the pan/tilt drive amount calculated in step S313.

As described above, according to the present embodiment, it is possible to reduce the influence of communication delay in a system for automatic shooting of sports.

Second Embodiment

Next, the second embodiment of the present disclosure will be described. The same components as those of the first embodiment are denoted by the same reference signs, and the description thereof will be omitted.

Figure 9:
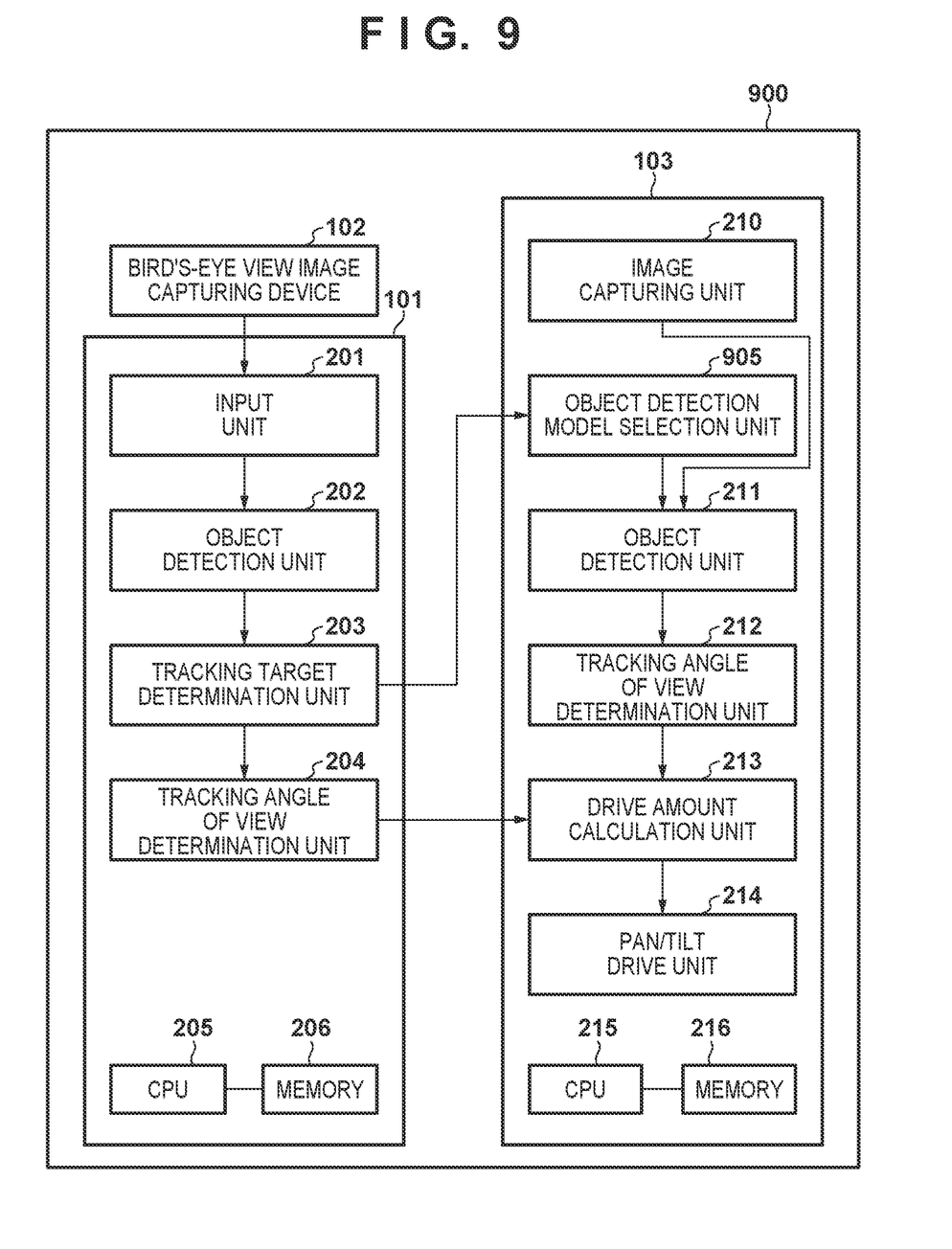
FIG. 9 is a block diagram illustrating a configuration of a tracking image capturing system in a second embodiment.

FIG. 9 is a view illustrating a block configuration of a tracking image capturing system 900 in the second embodiment.

The tracking target determination unit 203 of the control device 101 determines a tracking target based on the detection result of the object detection unit 202, and outputs the tracking target to an object detection model selection unit 905 of the pan/tilt image capturing device 103.

The object detection model selection unit 905 changes the model used for the object detection processing in accordance with the tracking target determined by the tracking target determination unit 203.

Figure 10:
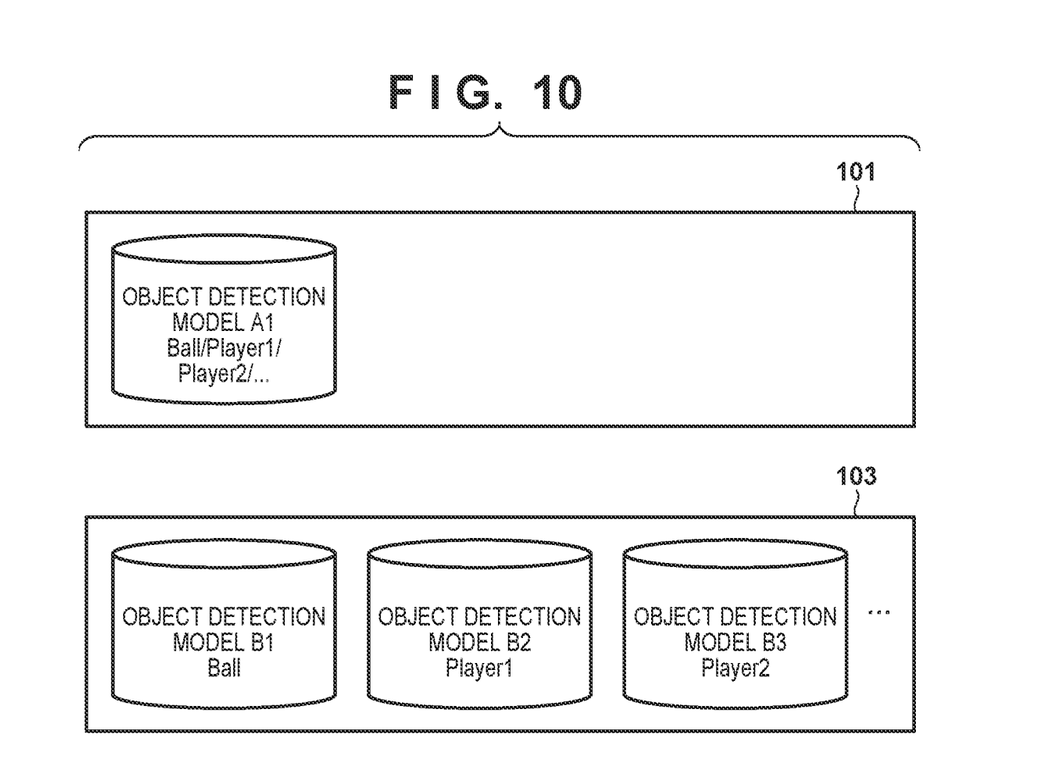
FIG. 10 is a view illustrating an example of an object detection model in the second embodiment.

FIG. 10 illustrates an example of the object detection model in the control device 101 and the pan/tilt image capturing device 103.

The control device 101 uses an object detection model A1 in which a plurality of classes (types of objects) such as Ball, Player 1, and Player 2 are defined. The pan/tilt image capturing device 103 has object detection models B1, B2, and B3 in which Ball, Player 1, Player 2, and the like are defined as a single class, and the object detection models to be used are switched based on the tracking target determined by the tracking target determination unit 203.

Figure 11A:
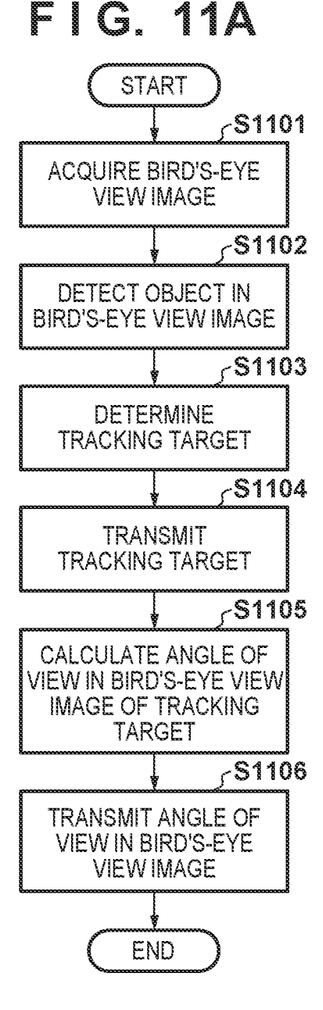
FIGS. 11A and 11B are flowcharts showing an operation of the tracking image capturing system in the second embodiment.
Figure 11B:
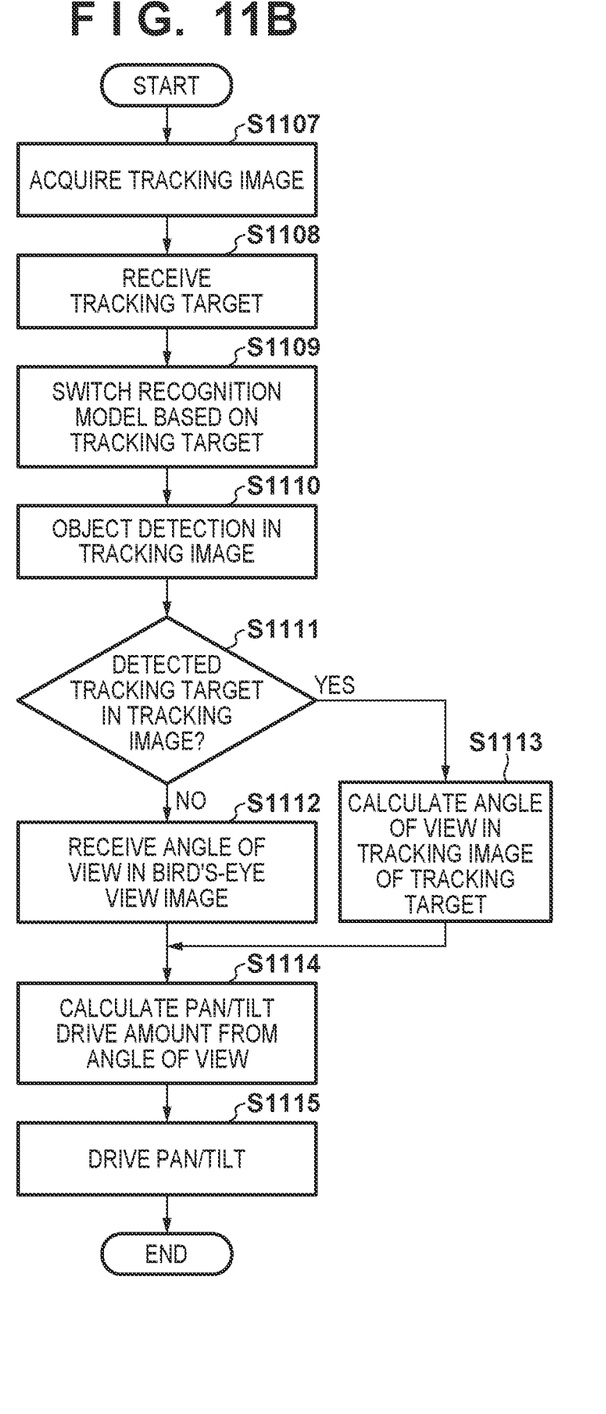

Hereinafter, the operation of the tracking image capturing system 900 configured as described above will be described with reference to the flowcharts shown in FIGS. 11A and 11B.

Since the processing of steps S1101 to S1107 is similar to the processing of steps S301 to S307 of the first embodiment, and the processing of steps S1111 to S1115 is similar to the processing of steps S310 to S314 of the first embodiment, the description thereof will be omitted.

In step S1108, the CPU 215 of the pan/tilt image capturing device 103 receives the information on the tracking target transmitted from the control device 101 in step S1104.

In step S1109, using the object detection model selection unit 905, the CPU 215 selects the object detection model B2 for detecting Player 1 based on a tracking target 401 received in step S1108.

In step S1110, using the object detection unit 211, the CPU 215 detects an object from the image acquired in step S1107. The object detection is executed by inputting the image acquired in step S1107 to the object detection model selected in step S1109.

Figure 12:
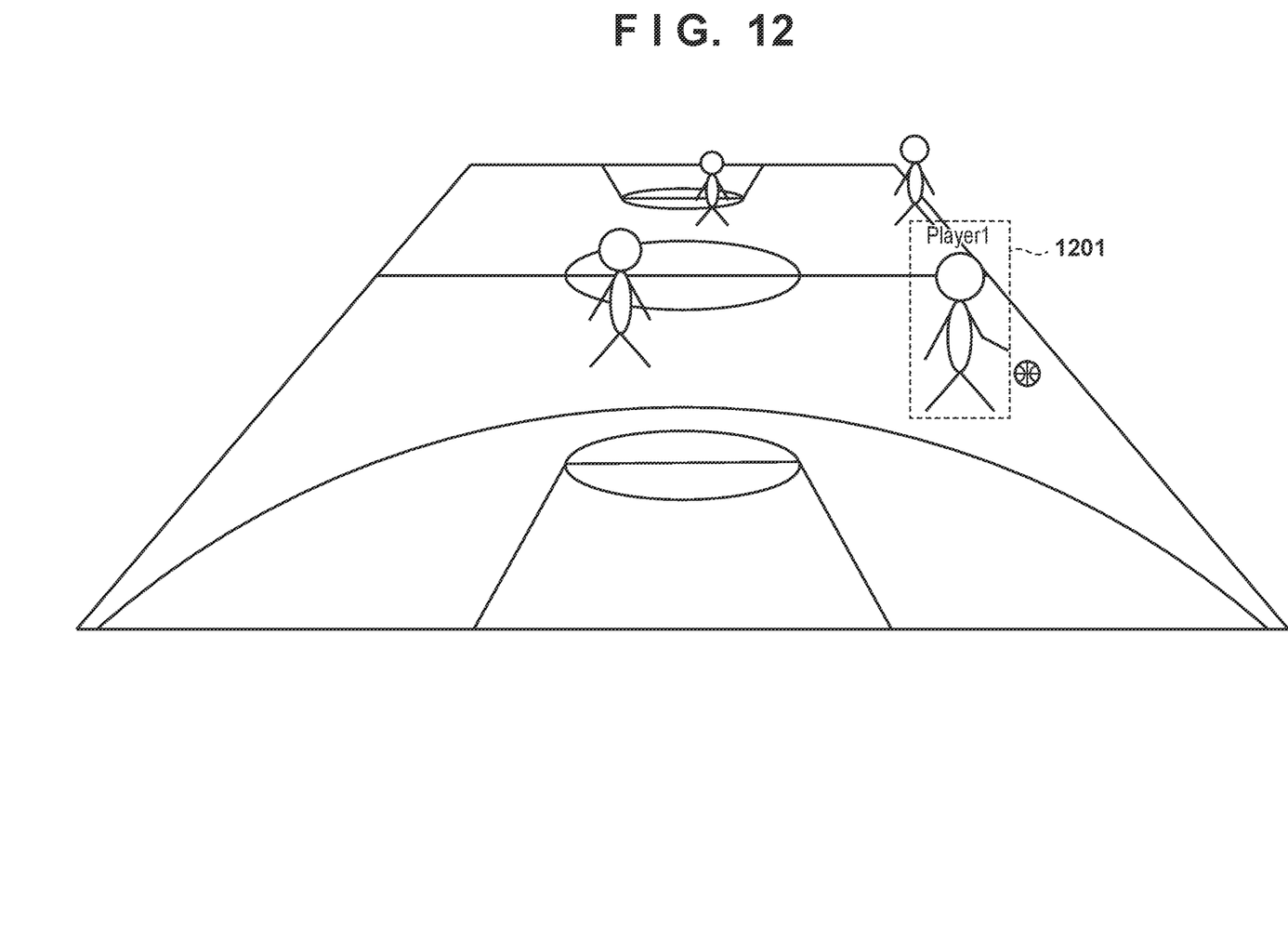
FIG. 12 is a view illustrating a result of object detection processing on a tracking image in the second embodiment.

FIG. 12 illustrates an example of a result of performing the object detection processing on the image of FIG. 7. In this case, only Player 1 (detection frame 1201) selected in step S1109 is detected, and detection processing of an object unnecessary for tracking control is not performed. Therefore, the calculation time in the object detection unit 211 can be reduced.

As described above, according to the present embodiment, it is possible to reduce the influence of calculation delay in a system for automatic shooting of sports.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-175025, filed Oct. 31, 2022, which is hereby incorporated by reference herein in its entirety.

What is claimed is:

1. A tracking image capturing system comprising:
at least one processor configured to function as:
a first acquisition unit that acquires a first image, the acquired first image being a bird's eye view image;
a second acquisition unit that acquires a second image corresponding to a part of the first image;
a first detection unit that detects a tracking target from the first image;
a first determination unit that determines an angle of view of an image acquired by the second acquisition unit so that an image acquired by the second acquisition unit includes the tracking target based on a detection result of the first detection unit;
a second detection unit that detects the tracking target from the second image;
a second determination unit that determines an angle of view of an image acquired by the second acquisition unit so that an image acquired by the second acquisition unit includes the tracking target based on a detection result of the second detection unit; and
a control unit that controls an angle of view of an image acquired by the second acquisition unit based on either the angle of view determined by the first determination unit or the angle of view determined by the second determination unit,
wherein the first detection unit detects the tracking target by using a first detection model that detects a plurality of objects and the second detection unit detects the tracking target by using at least one of a plurality of second detection models each of which detects a single object, and
wherein the second detection unit selects the at least one detection model from the plurality of detection models based on a result of detection of the tracking target by the first detection unit, and detects the tracking target.

2. The tracking image capturing system according to claim 1, wherein the first acquisition unit and the second acquisition unit acquire an image from an image capturing device.

3. The tracking image capturing system according to claim 1, wherein the first acquisition unit acquires an image of bird's-eye view of a sports scene.

4. The tracking image capturing system according to claim 1, wherein the second acquisition unit acquires an image captured with a player in a sports scene as the tracking target.

5. The tracking image capturing system according to claim 1, wherein in a case where the second image includes the tracking target, the control unit controls, based on the angle of view determined by the second determination unit, an angle of view of an image acquired by the second acquisition unit.

6. The tracking image capturing system according to claim 1, wherein in a case where the second image does not include the tracking target, the control unit controls, based on the angle of view determined by the first determination unit, an angle of view of an image acquired by the second acquisition unit.

7. The tracking image capturing system according to claim 1, wherein in a case where the second image does not include the tracking target, the control unit controls, based on the angle of view determined by the second determination unit, an angle of view of an image acquired by the second acquisition unit.

8. The tracking image capturing system according to claim 1, wherein at least some of the first detection unit, the first determination unit, and the control unit are arranged in a same housing as a housing of the first acquisition unit.

9. The tracking image capturing system according to claim 1, wherein at least some of the second detection unit, the second determination unit, and the control unit are arranged in a same housing as a housing of the second acquisition unit.

10. The tracking image capturing system according to claim 1, wherein the second acquisition unit changes an angle of view of an image acquired by the second acquisition unit by a pan and tilt operation.

11. The tracking image capturing system according to claim 1, wherein the second acquisition unit changes an angle of view of an image acquired by the second acquisition unit by changing a clipping position of an image.

12. A method for controlling a tracking image capturing system including a first acquisition unit that acquires a first bird's-eye view image and a second acquisition unit that acquires a second image corresponding to a part of the first image, the method comprising:
performing first detection of detecting a tracking target from the first image;
performing first determination of determining an angle of view of an image acquired by the second acquisition unit so that an image acquired by the second acquisition unit includes the tracking target based on a detection result in the first detection;
performing second detection of detecting the tracking target from the second image;
performing second determination of determining an angle of view of an image acquired by the second acquisition unit so that an image acquired by the second acquisition unit includes the tracking target based on a detection result in the second detection; and
controlling an angle of view of an image acquired by the second acquisition unit based on either the angle of view determined by the first determination or the angle of view determined by the second determination,
wherein in the first detection, the tracking target is detected by using a first detection model that detects a plurality of objects and in the second detection, the tracking target is detected by using at least one of a plurality of second detection models each of which detects a single object, and
wherein in the second detection, the at least one detection model is selected from the plurality of detection models based on a result of detection of the tracking target in the first detection, and the tracking target is detected.

13. A non-transitory computer-readable storage medium storing instructions that, when executed by one or more processors of configures a tracking image capturing system to operate as a first acquisition unit that acquires a first bird's-eye view image;
a second acquisition unit that acquires a second image corresponding to a part of the first image;
a first detection unit that detects a tracking target from the first image;
a first determination unit that determines an angle of view of an image acquired by the second acquisition unit so that an image acquired by the second acquisition unit includes the tracking target based on a result of detection by the first detection unit;
a second detection unit that detects the tracking target from the second image;
a second determination unit that determines an angle of view of an image acquired by the second acquisition unit so that an image acquired by the second acquisition unit includes the tracking target based on a result of detection by the second detection unit; and
a control unit that controls an angle of view of an image acquired by the second acquisition unit based on either the angle of view determined by the first determination unit or the angle of view determined by the second determination unit,
wherein in the first detection, the tracking target is detected by using a first detection model that detects a plurality of objects and in the second detection, the tracking target is detected by using at least one of a plurality of second detection models each of which detects a single object, and
wherein in the second detection, the at least one detection model is selected from the plurality of detection models based on a result of detection of the tracking target in the first detection, and the tracking target is detected.

\* \* \* \* \*